United States Patent
Gerhard et al.

(10) Patent No.: US 7,427,731 B2
(45) Date of Patent: Sep. 23, 2008

(54) ILLUMINATION UNIT AND METHOD FOR THE OPERATION THEREOF

(75) Inventors: Detlef Gerhard, Munich (DE); Martin Renner, Unterhaching (DE)

(73) Assignee: ICOS Vision Systems N.V., Heverlee (BE)

( * ) Notice: Subject to any disclaimer, the term of this patent is extended or adjusted under 35 U.S.C. 154(b) by 0 days.

(21) Appl. No.: 10/586,247

(22) PCT Filed: Jan. 17, 2005

(86) PCT No.: PCT/EP2005/000554

§ 371 (c)(1),
(2), (4) Date: Jun. 4, 2007

(87) PCT Pub. No.: WO2005/067365

PCT Pub. Date: Jul. 28, 2005

(65) Prior Publication Data

US 2007/0273891 A1 Nov. 29, 2007

(30) Foreign Application Priority Data

Jan. 16, 2004 (DE) .................. 10 2004 002 450

(51) Int. Cl.
*G01J 1/32* (2006.01)
*F21V 19/02* (2006.01)

(52) U.S. Cl. .................. 250/205; 250/227.11; 362/285; 362/372; 359/385

(58) Field of Classification Search ............... 250/205, 250/227.11; 362/284, 372; 359/385
See application file for complete search history.

(56) References Cited

U.S. PATENT DOCUMENTS

| 4,678,900 | A | * | 7/1987 | Nishioka | 250/205 |
| 5,013,311 | A | | 5/1991 | Nouri et al. | |
| 5,615,938 | A | * | 4/1997 | Lemke | 362/18 |
| 6,832,849 | B2 | * | 12/2004 | Yoneda et al. | 362/551 |
| 2002/0012502 | A1 | | 1/2002 | Harry et al. | |
| 2004/0156098 | A1 | * | 8/2004 | Dubois et al. | 359/368 |

* cited by examiner

*Primary Examiner*—Stephen Yam
(74) *Attorney, Agent, or Firm*—Jacobson Holman PLLC

(57) ABSTRACT

An illumination unit comprising
  a high-power light source (1),
  a first optical element (12) for focusing the light emitted from the high-power light source (1),
  a photometric head (8) for illuminating an object (3) in a predefinable manner,
  an optical waveguide (2) for transmitting the emitted and focused light to the photometric head (8),
  a displacement unit (6) for varying the axial distance between the high-power light source (1) with the first optical element (12) and the inlet of the optical waveguide,
wherein the cross-sectional surface of the focal point is at least twice as large as the cross-sectional surface of the optical waveguide (2) on the light inlet side, and the intensity of the light coupled into the optical waveguide (2) can be varied by axial displacement of the high-power light source (1).

13 Claims, 1 Drawing Sheet

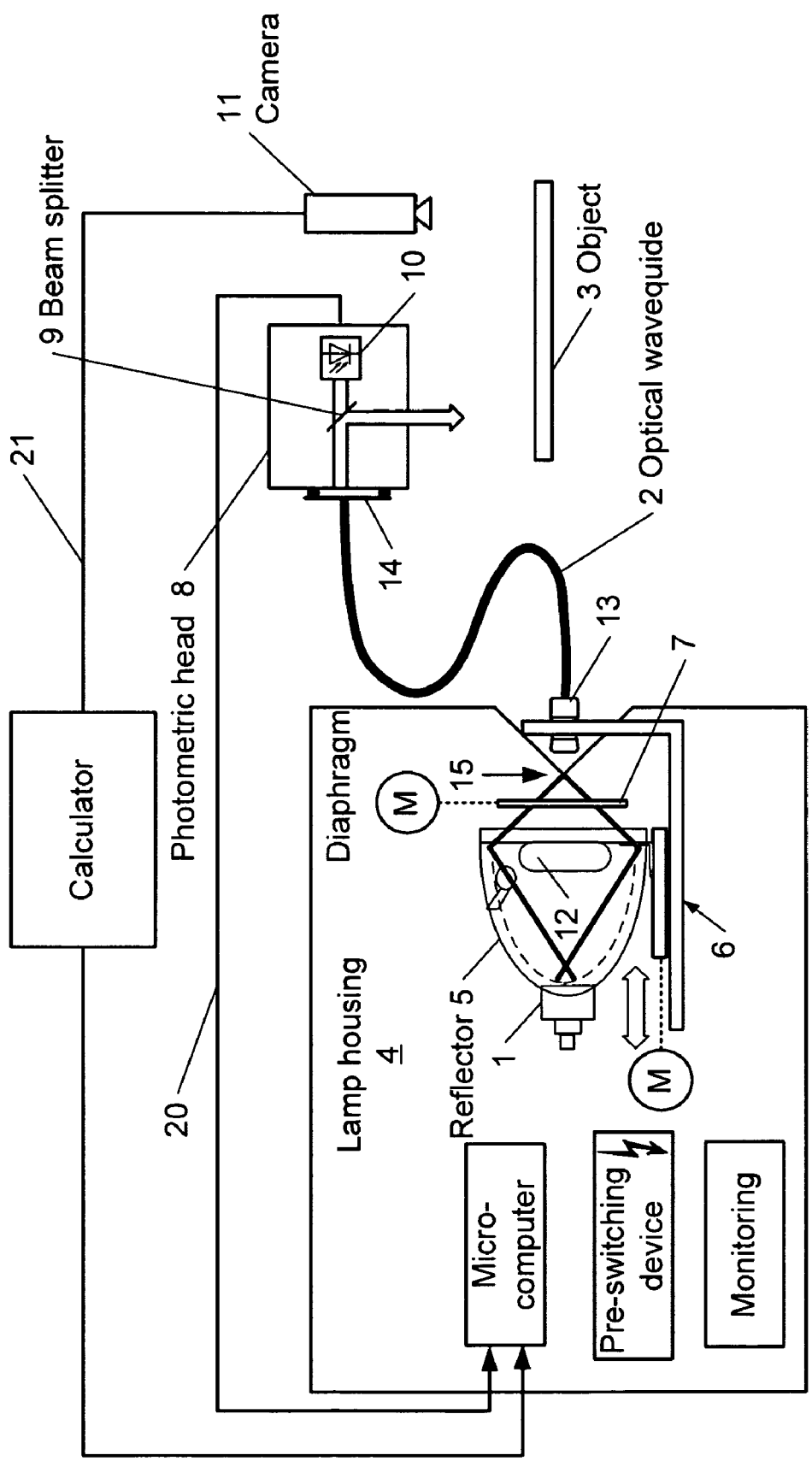

ILLUMINATION UNIT AND METHOD FOR THE OPERATION THEREOF

This is a 371 of PCT/EP2005/000554 filed 17 Jan. 2005.

The invention relates to an illumination unit which is operated with a high-power light source in order to inspect object surfaces.

For the optical inspection of dark object surfaces, and also to produce considerable enlargements or for processes with high inspection speeds, light sources with a high light intensity are required. In order to obtain a sufficiently illuminated, high-quality image of an object surface, an object surface which is illuminated as uniformly as possible and with a sufficient light intensity has to be recorded by means of a camera.

It should be noted that a light source of such an illumination unit usually ages. That is to say that the lamp becomes darker for the same supply parameters on the input side. Automatic inspection of object surfaces would therefore generate images of poorer quality, which can be evaluated only with difficulty.

Systems known to date vary the light power of a light source, for example by dimming the electrical power supply. Another possibility consists in using a diaphragm between the light source and the object.

Disadvantages when using high-power light sources consist in the fact that they cannot be dimmed electrically on the input side and also provide, on the output side, light energies that are so high that they are not compatible with the thermal stresses of elements that are additionally introduced into the beam path.

The object of the invention is to provide a high-power illumination for inspection tasks on object surfaces, which ensure uniform illumination of objects with a high light intensity. An operating method is also to be specified.

This object is achieved by the respective combination of features of claim 1 and claim 10. Advantageous further developments can be found in the dependent claims.

The invention is based on the knowledge that the light intensity at the output of an illumination unit can be dimmed in such a way that a homogeneous object illumination with a predefined light intensity can be set in that the light beam path of a high-power light source is focused by means of a first optical element, the light beam path is coupled into an optical waveguide, wherein the cross-sectional surface of the focal point is at least twice as large as the cross-sectional surface of the optical waveguide, the light is passed via the optical waveguide to a photometric head and from there is passed further to an object, and the light power on the object can be adjusted by axial variation of the distance between the light source and the light inlet face of the optical waveguide. In this case, the light distribution on the object surface is homogeneous. The reason for this is that the high-power light source or its light emission or light beam path is oriented approximately coaxially to the start region of the optical waveguide. Moreover, the cross-sectional surface of the focal point is designed in such a way that it significantly covers the inlet face of the optical waveguide, that is to say is at least twice as large as the latter. With conditions that are concentric on the whole, the light thus impinges on the inlet face of the optical waveguide, which corresponds to the core of the light beam path of the high-power light source. This eliminates any inhomogeneities in terms of the illumination. The dimming of the light intensity results from the fact that, for example when increasing the distance between the high-power light source and the inlet area of the optical waveguide, the inlet face of the optical waveguide is moved out of the focal point of the light beam path. This is synonymous with an increasing illumination spot at the location of the inlet face for the optical waveguide. The result of this is in turn that a correspondingly smaller amount of the overall light intensity of the high-power light source is coupled into the optical waveguide, and the light power can be set accordingly.

The illumination unit in this case consists of a housing, a displacement unit for the high-power light source together with the first focusing optical element, and an optical waveguide for transmitting the light to the object.

It is advantageous to furthermore provide a possibility for moving filters or diaphragms into the light stream. It is also possible to use a light-sensitive sensor, for example at an emerging beam path, in order to control the light intensity in a way that extends beyond simply adjusting the light intensity. The control process is monitored in an appropriate manner by means of an electronic unit.

It is advantageous to provide a further, second optical element at the input of the optical waveguide and to provide a further, third optical element at the input or at the output of a photometric head, wherein in each case the precise coordination of the optical transitions into or out of the optical waveguide is adapted accordingly.

Thus, in order to dim the illumination when using a high-power light source, the distance between the optical waveguide inlet and the light source is varied. This is tantamount to an increase, since in practice too small a distance between the optical waveguide and the high-power light source is not desired due to high thermal stresses. The variation of the distance between the focal area of the light beam path and the inlet face of the optical waveguide directly varies the amount of light coupled into the optical waveguide.

If, for example, certain color spectra are desired, appropriate filters can be introduced into the beam path. If a certain additional reduction in light power is to take place, a screening diaphragm is introduced into the beam path for dimming purposes.

Control of the brightness during illumination of an object surface takes place via a feedback signal which measures the light intensity with the aid of a photodetector arranged at any point behind the optical waveguide outlet. The sensor signal is fed to control electronics. The control process acts on the lamp in such a way that the desired value and the actual value are made to coincide.

In the text which follows, an example of embodiment will be described with reference to a schematic FIGURE which does not restrict the invention.

The FIGURE shows an illumination unit consisting of a lamp housing with a high-power light source, an optical waveguide, a photometric head which illuminates an object, and electrical or electronic units for supplying power to and controlling the system.

The FIGURE shows in particular a device for uniformly illuminating an object 3 while at the same time having a control possibility. Uniform illumination is understood to mean a homogeneous light distribution, so that for example no fluctuations in brightness on the illumination side can be seen over the surface. One significant advantage consists in the fact that the negative effects of ageing processes on the high-power light source can be eliminated by the control process.

Further advantages result from the use of metal halide gas discharge light sources and also from the use of a liquid optical waveguide. The liquid optical waveguide serves for better cooling, since conventional optical waveguides, for example made of plastic, do not withstand high thermal stresses. By using additional optical elements, such as the second optical element 13 and the third optical element 14, fine tuning can be performed between various elements of the illumination unit.

The high-power light source 1 is contained as the main element in the housing 4. This light source may for example be provided with a reflector 5. By means of a first optical element 12, the light emitted from the high-power light source 1 is focused, so that a focal area 15 is provided. Power supply elements and control and monitoring elements are also provided in the housing 4, such as a microcomputer, a ballast or other monitoring units for example. As shown in the FIGURE, a displacement unit 6 has an L-shaped support, the longer leg of which is positioned horizontally, which support both fixes the input end of the optical waveguide 2 and a second optical element 13 as well as an adjustment device which can be moved by means of a motor M and which serves to axially displace the high-power light source 1 and the corresponding focal point relative to the light inlet face of the optical waveguide. Motor control is also provided for the positioning of filters or diaphragms 7.

The light coupled into the optical waveguide 2 is coupled into the photometric head at the other end of the optical waveguide 2 either directly or via a third optical element 14, said light being split by a beam splitter into the illumination beam, which is directed toward the object 3, and a side branch which is fed to a photosensor 10. The third optical element 14 may be fitted either on the input side of the photometric head 8 or on the output side.

By means of the first control loop 20, it is possible to control the illumination intensity, as detected for example in the photometric head in the FIGURE, on the basis of this optoelectric signal which is generated by the photosensor 10. Another option consists in using the second control loop 21, wherein the light measurement of the actual value takes place via the camera 11, which is used in any case for the purpose of inspecting the object surface. In the second case, the use of a computer for image processing purposes is also necessary, wherein the desired value for the first control loop is derived from the detection signal for the light intensity.

The position of the focal point or focal area 15 which is shown schematically in the FIGURE represents a relative position of the high-power light source 1 in the retracted position. In other words, this position means that the focal point does not lie in the plane of the inlet face of the optical waveguide 2 but rather has been displaced axially between the optical waveguide and the light source. Only a relatively small amount of the light thus enters the optical waveguide 2, since the cross section of the light inlet face, which is invariable per se, is illuminated only by a very small portion of the overall light spot. The reason for this is that the illumination spot present in the plane of the light inlet face of the optical waveguide 2 is much larger than the cross-sectional surface of the light inlet.

The invention claimed is:

1. An illumination unit comprising
   a high-power light source (1),
   a first optical element (12) for focusing the light emitted from the high-power light source (1),
   a photometric head (8) for illuminating an object (3) with a predefined brightness value,
   an optical waveguide (2) for transmitting the emitted and focused light to the photometric head (8),
   a displacement unit (6) for varying the axial distance between the high-power light source (1) with the first optical element (12) and the inlet of the optical waveguide,
   wherein the cross-sectional surface of the focal point is at least twice as large as the cross-sectional surface of the optical waveguide (2) on the light inlet side, and the intensity of the light coupled into the optical waveguide (2) can be varied by axial displacement of the high-power light source (1).

2. An illumination unit as claimed in claim 1, in which a second optical element (13) is provided on the light inlet side of the optical waveguide (2) in order to adapt the light beam paths outside or inside the optical waveguide (2).

3. An illumination unit as claimed in claim 1, in which a third optical element (14) is provided at the beam input or beam output of the photometric head (8).

4. An illumination unit as claimed in claim 1, in which the high-power light source (1) is a gas discharge light source.

5. An illumination unit as claimed in claim 4, in which the gas discharge light source is a metal halide light source.

6. An illumination unit as claimed in claim 1, in which the optical waveguide (2) consists of a liquid.

7. An illumination unit as claimed in claim 1, in which a device for moving filters or diaphragms in and out is provided directly behind the first optical element (12).

8. An illumination unit as claimed in claim 1, in which a photosensor (10) for detecting the light intensity and/or for controlling the illumination of the object is provided in the photometric head (8).

9. An illumination unit as claimed in claim 1, in which a camera (11) which is provided for recording the object can be used to control the illumination of the object.

10. A method for the controlled operation of an illumination unit for uniformly illuminating an object (3) by means of a high-power light source (1), wherein the light that has been emitted from the high-power light source (1) and focused is passed to the object (3) via an optical waveguide (2) and a photometric head (8) with a photosensor (10), in each case a variable amount of light is coupled into the optical waveguide (2) by varying the axial distance between the high-power light source (1) and the light inlet face of the optical waveguide (2), the cross-sectional surface of the light beam path at the focal point is at least twice as large as that of the optical waveguide (2) on the light inlet side, and the illumination of the object (3) is controlled by means of the photosensor (10).

11. A method as claimed in claim 10, in which various filters or diaphragms can be moved in between the high-power light source (1) and the optical waveguide inlet, so that the light beam path can be conditioned accordingly.

12. A method as claimed in claim 10, in which additionally a signal from a camera (11) which is provided for recording the object is used to control the illumination of the object.

13. A method as claimed in claim 10, in which, by using an adjustment element on an object support, the brightness at this element is measured by means of a camera and is adjusted to a desired value for the brightness via the control loop, wherein the value measured by means of the photometric head is used as the new desired value for the first control loop of the illumination, until a new value is defined by the camera.

* * * * *